(12) United States Patent  
Nakatani

(10) Patent No.: US 7,756,318 B2  
(45) Date of Patent: Jul. 13, 2010

(54) PATTERN INSPECTION APPARATUS AND METHOD WITH LOCAL CRITICAL DIMENSION ERROR DETECTABILITY

(75) Inventor: Yuichi Nakatani, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 910 days.

(21) Appl. No.: 11/560,039

(22) Filed: Nov. 15, 2006

(65) Prior Publication Data

US 2007/0292014 A1  Dec. 20, 2007

(30) Foreign Application Priority Data

Jun. 20, 2006  (JP) .............................. 2006-169512

(51) Int. Cl.  
G06K 9/00  (2006.01)

(52) U.S. Cl. ...................... 382/141; 382/145; 382/146; 382/147; 382/149; 382/151; 382/152

(58) Field of Classification Search ................. 382/144, 382/145, 141, 146, 147, 149, 151, 152  
See application file for complete search history.

(56) References Cited

U.S. PATENT DOCUMENTS

2003/0096436 A1* 5/2003 Satya et al. .................... 438/11

FOREIGN PATENT DOCUMENTS

| JP | 2002-22421 | 1/2002 |
| JP | 2005-196471 | 7/2005 |
| JP | 2005-233869 | 9/2005 |

* cited by examiner

*Primary Examiner*—Matthew C Bella  
*Assistant Examiner*—Mike Rahmjoo  
(74) *Attorney, Agent, or Firm*—Oblon, Spivak, McClelland, Maier & Neustadt, L.L.P.

(57) ABSTRACT

A mask/reticle pattern inspection apparatus capable of readily detecting local critical dimension (CD) errors of a circuit pattern of a testing workpiece is disclosed. This apparatus includes a search unit for finding a plurality of resembling or "look-alike" adjacent patterns around a specific pattern on the workpiece, which have similarity to the specific pattern. The inspection apparatus also includes a calculation unit for obtaining dissimilarity between the specific pattern and look-alike adjacent pattern, a variation evaluation unit which excludes an allowable error from the dissimilarity to thereby obtain a local CD error criterion value, and a CD error decision unit for determining the presence of a local CD error when the criterion value exceeds a threshold value in case the distance between the specific and look-alike patterns increases. A pattern inspection method is also disclosed.

5 Claims, 4 Drawing Sheets

PATTERN INSPECTION APPARATUS AND METHOD WITH LOCAL CRITICAL DIMENSION ERROR DETECTABILITY

CROSS-REFERENCE TO RELATED APPLICATION(S)

This application claims priority to Japanese Patent Application No. 2006-169512, filed Jun. 20, 2006, the disclosure of which is incorporated herein by reference.

FIELD OF THE INVENTION

The present invention relates generally to pattern inspection technologies for inspecting the pattern of a target object being tested. More particularly, but not exclusively, this invention relates to a method and apparatus for pattern inspection of a workpiece, such as a photomask or a reticle for use in the manufacture of highly integrated semiconductor devices and liquid crystal display (LCD) panels.

DESCRIPTION OF RELATED ART

In general, considerable costs are required for fabrication of advanced semiconductor devices of large-scale integration (LSI). Thus it is inevitable to improve manufacturing yields. There are several factors to lower the yields, one of which is the presence of pattern defects of a reticle to be used when lithographically transferring for exposure an ultrafine pattern onto semiconductor wafers. In recent years, as LSI patterns further decrease in minimum feature size, the minimal size of defects to be detected decreases accordingly. This requires pattern inspection equipment that checks reticle defects to offer further increased accuracy.

Methodology of inspecting a pattern for defects typically includes two major approaches, one of which is to employ a die-to-die (DD) comparison technique, and the other of which is to use a die-to-database (DB) comparison scheme. The DD comparison is a method for detecting pattern defects by comparison between two separate dies on a reticle being tested. The DB comparison is a method of detecting defects by comparing a die on a reticle to a database of circuit patterns as generated from computer-aided design (CAD) data for the LSI design use. Of the two dies in DD comparison, a pattern image to be subjected to the defect inspection is called the optical image whereas the other optical image for use as an inspection standard is called the fiducial or "benchmark" image. Additionally, a die image in DB comparison is called the optical image, while the referral image of the database is called the fiducial image.

In recent years, with further miniaturization of on-reticle patterns, a need arises to detect extra-small defects which are so small in size to be buried in pixel position offsets of target pattern images being compared together and also in image expansion/shrink, swelling, and sensing noises. An approach to detecting such microdefects is disclosed, for example, in Published Unexamined Japanese Patent Application No. 2005-196471. A defect detection method as taught thereby eliminates the use of a technique for directly comparing an optical image to a reference image. Instead, the method is designed to include the steps of using the reference image to conduct a search for those patterns which seem to be the same in design feature as each other, and comparing these patterns together to thereby determine whether they are truly the same on the optical image of interest. This method is called an intercomparison inspection scheme.

Unfortunately, the prior art approach is faced with a problem which follows. A circuit pattern that is formed or "depicted" on a base material, such as a photomask, accompanies the existence of a specific type of errors which cause the mask pattern to receive identical deformation through a certain surface area, including parallel movement, size variation or like deformations. Such errors of this type will be referred to hereinafter as local critical dimension (CD) errors. See FIG. 2. This diagram shows an exemplary local CD error with a pin-hole (white dot) being locally offset leftward as indicated by arrow within a region "A" that is encompassed by a solid-line rectangle. This local CD error is hardly detectable by mere comparison between graphical pattern segments "a" and "b6" because of the fact that no appreciable differences take place therebetween since these undergo the same deformation. This brings a decrease in effective image signal components, which in turn leads to a likewise decrease in signal-to-noise (S/N) ratios in the intercomparison inspection scheme.

BRIEF SUMMARY OF THE INVENTION

It is therefore an object of this invention to increase the inspection accuracy of workpiece patterns being inspected.

It is another object of the invention to provide a technique capable of detecting local critical dimension (CD) errors of workplace patterns under inspection while reducing or minimizing complexities.

To attain the foregoing objects, in accordance with one aspect of the invention, an apparatus for inspecting a pattern as formed on a workplace being tested is provided, which includes a search unit that operates to find a plurality of resembling or "look-alike" patterns residing near or around a specific pattern on the workplace and each having increased similarity to the specific pattern, a calculation unit for obtaining a degree of dissimilarity between the specific pattern and each look-alike neighboring pattern, a variation evaluation unit for excluding an allowable error, or tolerance, from the dissimilarity to thereby obtain a local CD error criterion value, and a CD error decision unit for determining the presence of a local CD error when the criterion value is in excess of a threshold value in the case where the distance between the specific and look-alike neighboring patterns increases.

In accordance with another aspect of the invention, a pattern inspection method of inspecting a pattern formed on a workpiece being tested is provided. This pattern inspection method includes the step of specifying a plurality of look-alike neighboring patterns around a specific pattern on the workpiece. The neighboring patterns have similarity to the specific pattern. Then, obtain a degree of dissimilarity between the specific pattern and each look-alike neighboring pattern. Next, remove or "delete" an allowable error from the dissimilarity to thereby obtain a local CD error criterion value. When the distance between the specific and neighboring patterns increases, if the criterion value goes beyond a threshold value, then determine the presence of a local CD error.

DETAILED DESCRIPTION OF THE INVENTION

Figure 1:
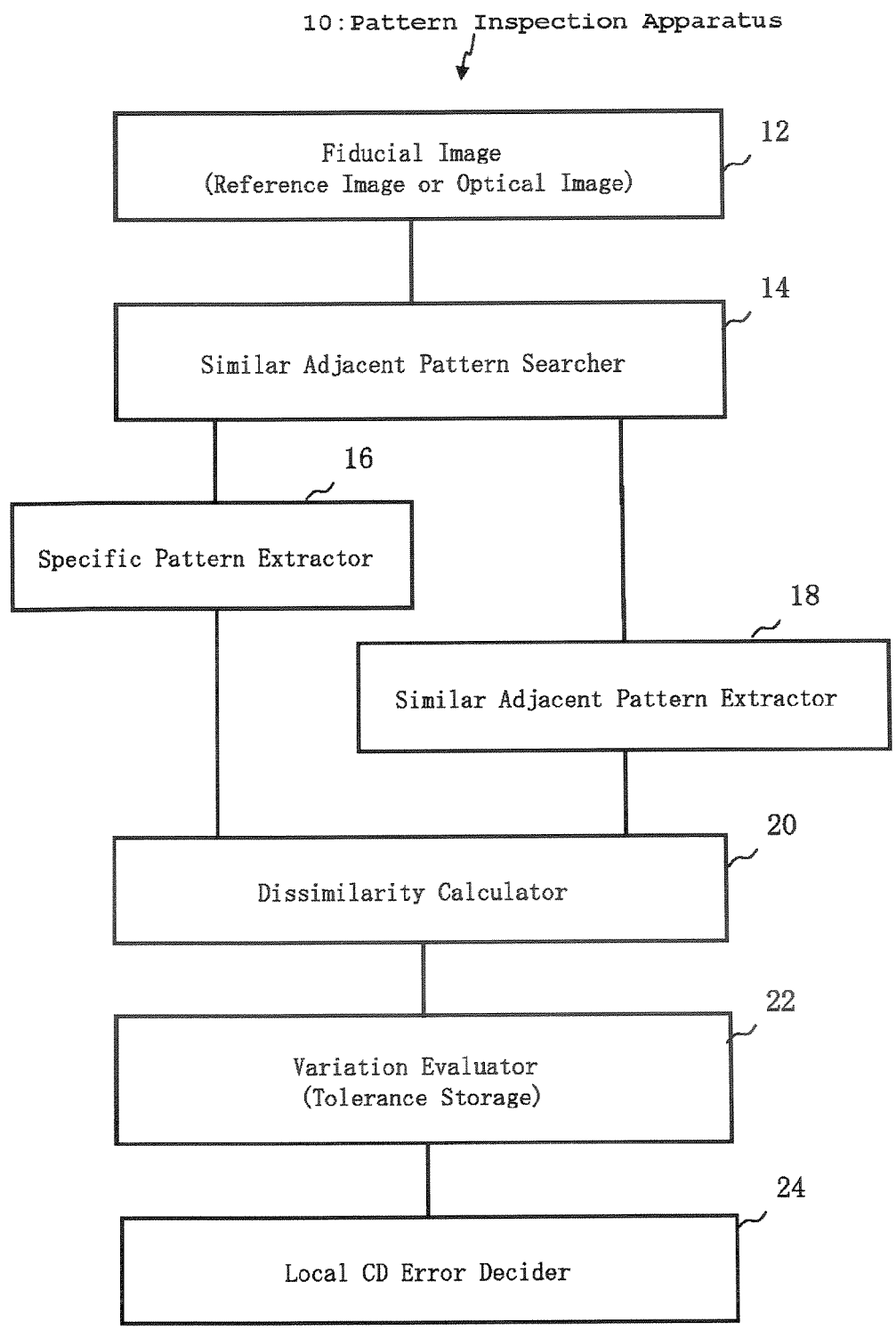
FIG. 1 is a block diagram of a function module for local critical dimension (CD) error check as used in a pattern inspection apparatus embodying the invention.

A mask/reticle pattern inspection apparatus and method incorporating the principles of this invention will be described with reference to the accompanying figures of the drawing below.

Pattern Inspection Apparatus

Referring to FIG. 1, a configuration of a functional module for local critical dimension (CD) error detection is shown, which is used in a pattern defect inspection apparatus 10 embodying the invention. The local CD error detector shown herein is operatively responsive to receipt of a fiducial pattern image 12, which may be either a reference image or an optical image of circuit pattern. The error detector is generally made up of a resembling or "look-alike" neighboring pattern searching unit 14, a first pattern extraction unit 16 for finding for extraction a specific pattern of optical image, a second pattern extraction unit 18 for extracting from the optical image a plurality of look-alike neighboring pattern components near or around the specific pattern, each of which has an increased similarity thereto, a dissimilarity calculation unit 20, a variation evaluation unit 22, and a local CD error decision unit 24.

The fiducial image 12 is an inspection standard image to be used for comparison with an optical image being tested. Fiducial image 12 may be either a reference image or an optical image. The reference image for use as fiducial image 12 is an image which is obtainable from pattern design data to resemble an optical image, i.e., have an increased degree of similarity thereto. Alternatively, the optical image for use as fiducial image 12 is the one that was acquired by an optical image acquisition device and is usable as the standard or "benchmark" for pattern inspection. The pattern search unit 14 functions to conduct a search to find from the fiducial image 12 a certain graphic pattern (i.e., specific pattern) in close proximity to a target pixel to be inspected and also more than two, i.e., a maximum "k" (k is an integer) of neighboring graphics patterns that seem to be identical to the specific pattern—say, "look-alike" neighboring patterns or, simply, "similar adjacent" patterns. The specific pattern extractor 16 is a digital data processing unit which operates to extract from the optical image being tested a pixel array residing at the position of the specific pattern. The look-alike neighboring pattern extractor 18 is a digital data processing unit which extracts pixel arrays at or near the positions of the similar adjacent patterns in the optical image under inspection.

The dissimilarity calculator 20 is a digital processing unit for determining the dissimilarity between the specific pattern of the optical image being tested and a respective one of the similar adjacent patterns—that is, a degree of unlikeness between these patterns. The variation evaluator 22 excludes an allowable error from the dissimilarity to thereby obtain through computation a local CD error criterion value. The allowable error may typically be an ordinary tolerance, which is equivalent to the dissimilarity of a similar adjacent pattern relative to the specific pattern occurring in a case where no local CD errors are present. The local CD error decision unit 24 is a processing unit operative to determine or "judge" the presence of a local CD error when the local CD error criterion value goes beyond a prespecified threshold level in the case of an increase in distance between the specific pattern and the similar adjacent pattern of interest.

Figure 2:
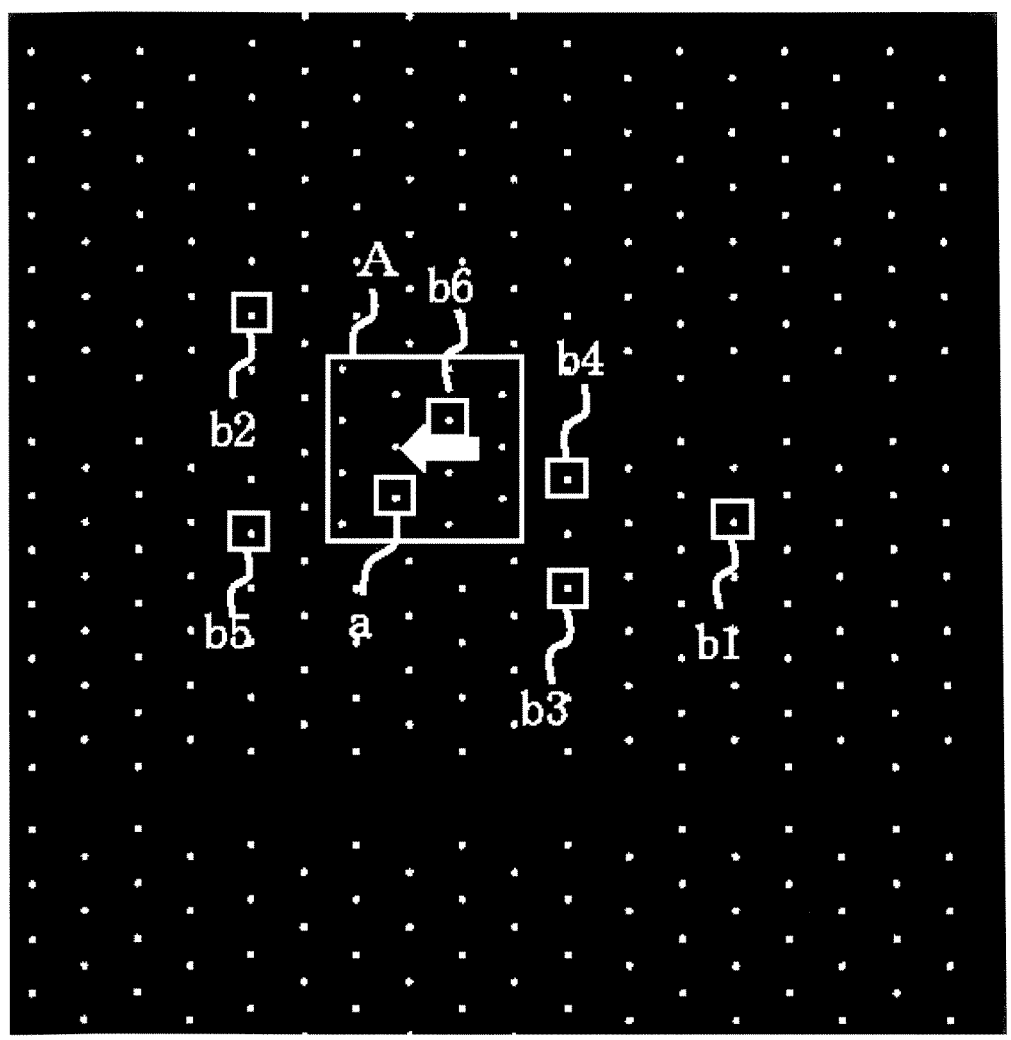
FIG. 2 is a diagram pictorially showing a specific pattern and its neighboring patterns with increased similarity thereto on a workpiece surface for explanation of a local CD error detection procedure.

In a procedure for local CD error detection, a system routine starts with a step of obtaining dissimilarity between the specific pattern and its neighboring look-alike patterns, i.e., similar adjacent patterns. Next, specify an exact distance between the specific pattern and each similar adjacent pattern. When the pattern distance is larger than a predetermined value, if the dissimilarity of these patterns is large, then determine there is a possibility that a local CD error is present. For example in FIG. 2, a pattern "a" is regarded as the specific pattern while letting its neighboring patterns b1 to b6 be the look-alike patterns with increased similarity thereto. When comparing the pattern a to the similar adjacent pattern b6 both of which are in a region A, no appreciable difference takes place therebetween because of the fact that both of them are within the region A which is under the influence of identical deformation. On the contrary, the dissimilarity of any one of the remaining similar adjacent patterns b1-b5 which are out of the region A and which are far from the specific pattern a is relatively large due to the influence of the fact that the region A is offset in the direction indicated by arrow in FIG. 2. This suggests occurrence of a local CD error(s).

Figure 3:
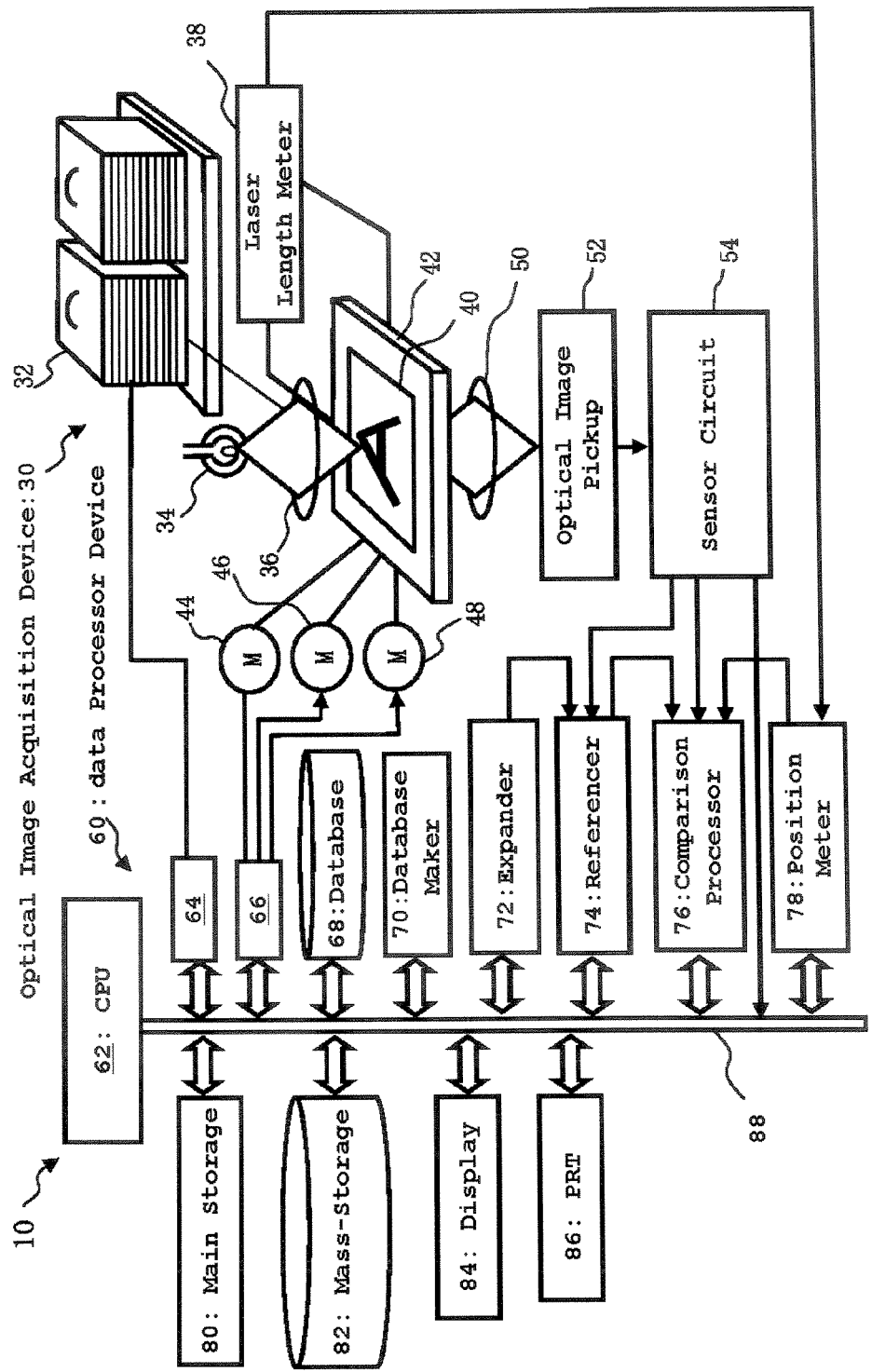
FIG. 3 is a diagram showing an overall configuration of the pattern inspection apparatus.

See next FIG. 3, which shows an overall system configuration of the pattern inspection apparatus 10. This inspection apparatus is the one that inspects for defects a circuit pattern of a target object being tested, such as a photomask, reticle or like workpieces. The apparatus 10 includes an optical image acquisition device 30 and a data processing device 60. The optical image acquisition device 30 is generally made up of an auto-loader mechanism 32, a light source 34, an illumination optics 36, a movable table structure 42 which supports thereon an object to be tested, a laser length measurement system 38 for measuring a present position of the table 42 on a real-time basis, a set of three-axis actuator motors 44, 46 and 48 for driving the table 42 in X, Y and θ directions, a focused image forming optics 50 for irradiating light indicative of a pattern image onto an optical image sensing/pickup unit 52, and a sensor circuit 54 operatively responsive to receipt of an electrical output signal of the optical image sensed by the pickup 52.

The data processor device 60 is configured from a central processor unit (CPU) 62 which executes various data processing tasks, an auto-loader control unit 64 for control of the auto-loader 32, a table controller 66 for drive and control of the table 42, a database storage 68 which stores CAD data, a database creation unit 70, a data expansion unit 72 for expanding design data of a mask or else, a referencing unit 74 for preparing a reference image from the expanded data as obtained from the expander 72, a comparison processor unit 76 for performing comparison between a pattern image under testing and a fiducial image, a position measurement unit 78 for measuring from a present position of the table 42 the position of a pattern of the test object 40, a main memory device 80 for storing data therein, a large-capacity storage device 82, a display device 84, and a hard-copy generator 85, such as a printer. These devices are connected together via a data transfer bus 88, for example. Note here that the above-stated function blocks of FIG. 1—i.e., the pattern searcher 14, pattern extractors 16-18, dissimilarity calculator 20, variation evaluator 22 and local CD error decider 24—are functionally achievable by the data processor 60 including the CPU 62 and comparison processor 76.

Operation of Pattern Inspection Apparatus

The test object 40, such as an exposure-use mask or else, is transported by the auto-loader mechanism 32 onto the table 42 and is unloaded therefrom after completion of inspection in an automated way. The light source 34 disposed over table 42 emits rays of light, which are guided to fall onto the test object 40 via the illumination optics 36. Disposed beneath the test object 40 are the image forming optics 50 and sensor circuit 54. Transmission light that passed through the mask pattern of test object 40 reaches a photosensitive surface of the sensor circuit 54 through the imaging optics 50 so that a focused image is formed thereon. The imaging optics 50 may be associated with an auto-focussing mechanism (not shown) for automatic focusing adjustment purposes.

The table 42 is controlled by the table controller 66 which is responsive to a command(s) from the data processor 60. Table 42 is movable in X and Y directions with or without rotation in $\theta$ direction while being driven by any one or ones of the three-axis (X-Y-$\theta$) motors 44-48. These motors may be steeper motors. The sensor circuit 54 has a built-in sensor, such as a time delay integration (TDI) sensor. While letting table 42 move in the X axis direction continuously, the TDI sensor operates to sense the pattern of the test object 40, and then generates an electrical signal indicative of image pickup data. This data is sent as a test pattern image data to the comparison processor 76. An example of the test pattern image data is a stream of sign-less eight-bit digital data indicating graytone levels of the brightness of each pixel.

The reference image is created by the expander 72 and referencer 74 from the design data as stored in the large-capacity storage device 82 and is then transferred to the comparison processor 76. This processor 76 processes the optical image and the reference image and is capable of finally detecting a local CD error(s) in cooperation with the CPU 62. Additionally the data processor 60 is configurable from hardware or software or any combinations thereof.

Pattern Inspection Method

Figure 4:
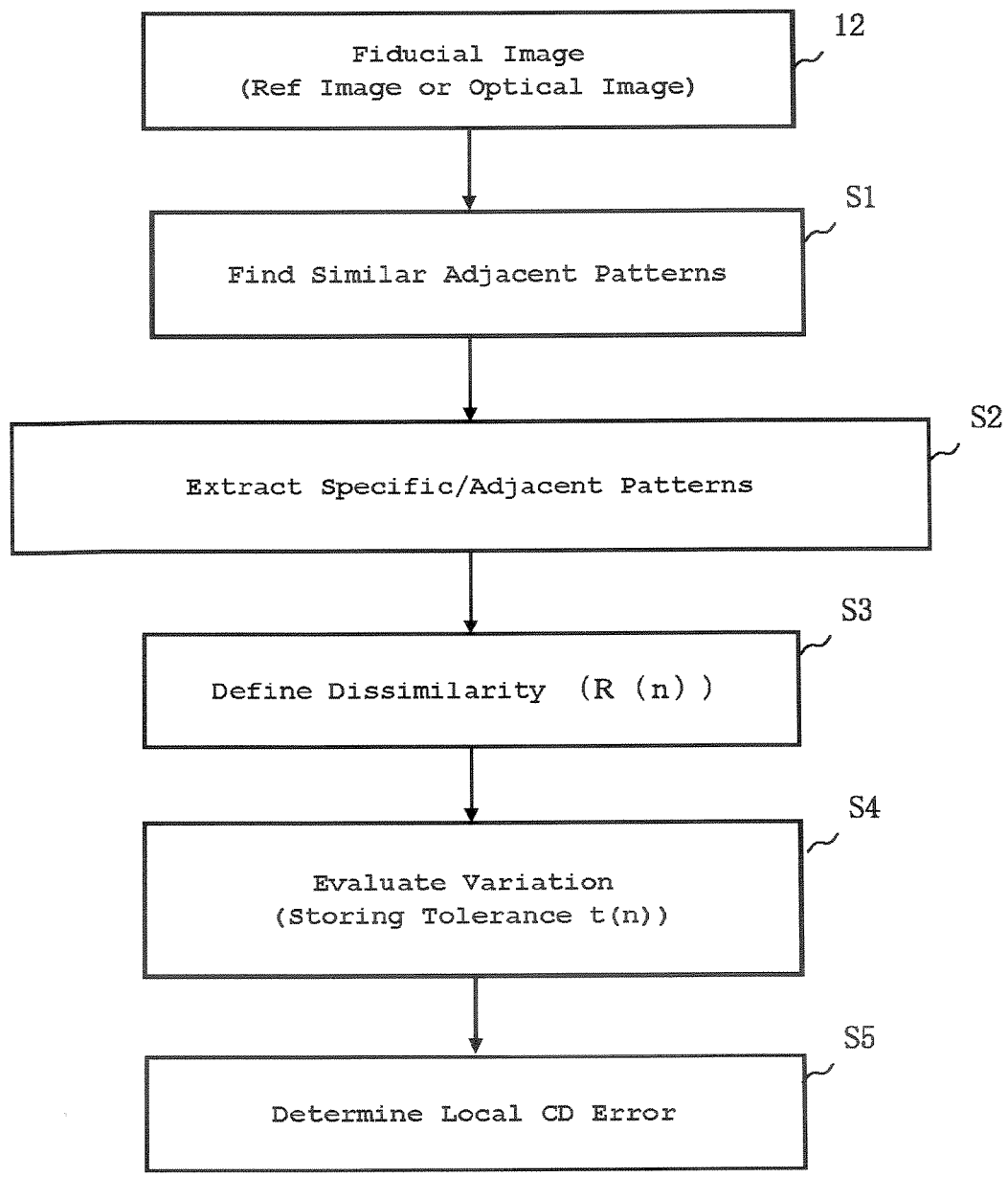
FIG. 4 is a flow diagram of major process steps of a pattern inspection method also embodying the invention.

Referring to FIG. 4, major steps of a pattern inspection method for inspecting the pattern of workpiece 40 being tested is shown in a flowchart form. The illustrative procedure starts with step S1, which uses the fiducial image 12 of workpiece 40 to conduct a search for a specific pattern and its neighboring patterns with increased similarity in geometry to the specific pattern—say, similar or "look-alike" adjacent patterns. The procedure goes next to step S2, which performs extraction of the specific pattern and the look-alike adjacent patterns from an optical image which was acquired by the image acquisition device 30 shown in FIG. 3. Then, go to step S3 which calculates through computation the dissimilarity, R(n), between the specific pattern and a respective one of the similar adjacent patterns. Next, go to step S4 for variation evaluation. At this step S4, remove or subtract an allowable error from the dissimilarity to thereby obtain a local CD error criterion value. Then, at step S5, local CD error determination is done in a way which follows. When the distance between the specific pattern and the similar adjacent pattern, if the local CD error criterion value exceeds a predetermined threshold level then determine or "judge" that a local CD error must be present.

At the similar adjacent pattern search step S1, the adjacent pattern searcher 14 shown in FIG. 1 is rendered operative to find resembling patterns in a target image under inspection by use of the main memory 80 and storage 82 and CPU 62 of FIG. 3. First, specify a specific pattern in close proximity to a target pixel in the fiducial image. Then, find from around the target pixel a maximum of k look-alike adjacent patterns which seem to be identical in graphical features to the specific pattern. The fiducial image as used here may be either a reference image as obtained from the CAD design data or an optical image obtained at the optical image acquisition device 30 of FIG. 3.

To find the similar adjacent patterns, a variety of approaches are available. One exemplary approach is to use the following method. Specify for list-up every point that belongs to the fiducial image with ⅛ pixel as a unit scale. Let this list of points be a sequence of attention points $\{Cp\}$. Extract from the fiducial image a rectangular region having a matrix of fifteen rows and fifteen columns (15×15) pixels with an element Ci (i=1, 2, . . . , q, where q is an integer) of the attention point sequence $\{Cp\}$ as a center thereof. The rectangular region thus extracted is regarded as a peripheral rectangular area. Similarly, extract from the fiducial image another rectangular region having 15×15 pixels with a to-be-inspected pixel as its center. Let this region be a specific rectangle area. Compute an accumulative square difference or disparity between pixels that belong to both the specific rectangle area and the peripheral rectangle area. If this accumulative square disparity is less than or equal to a predefined threshold value then determine these are the same in pattern as each other, which will then be added to candidates for the similar points—i.e., look-alike point sequence $\{Dm\}$.

Then, examine the look-alike point sequence $\{Dm\}$ to ascertain whether points Di, Dj (i and j are integers, where i<j) are present therein, which are spaced apart from each other by less than seven pixels in the so-called "city block" distance. If such points Di, Dj are found then remove or "delete" them from the look-alike point sequence $\{Dm\}$. A string of those points that are finally obtained in this way is regarded as a sequence of look-alike adjacent points $\{Em\}$. A point contained in this look-alike adjacent point sequence $\{Em\}$ is the coordinate center of a graphic pattern (similar adjacent pattern) that is the same as the vicinity of a to-be-inspected pixel which was searched up from a region (x, y) of the fiducial image. A set of center points of N similar adjacent patterns is thus obtained in this way. Let this center-point sequence be a descending-order similar adjacent point sequence $\{Fl\}$ ($1 \leq k$). Note here that the descending-order similar adjacent point sequence $\{Fl\}$ is such that the points therein are sorted in the descending order in terms of the city block distance from the to-be-tested pixel—that is, the sorting is done from a far side. More specifically, a point of n=1 is laid out at the furthest, and points of n=2, n=3, . . . , n=N are disposed to become gradually closer to the target pixel as the value of n increases.

At the step S2 for extraction of the specific pattern and the similar adjacent patterns, the specific pattern extractor 16 and similar pattern extractor 18 of FIG. 1 use the descending-order similar adjacent point sequence $\{Fl\}$ obtained for the fiducial image to extract from the optical image under inspection those pixels corresponding thereto. An example is that for the specific pattern extraction, a rectangular region with grayscales $(s_{11}, s_{12}, \ldots s_{1515})$ of 15×15 pixels of the specific pattern is extracted from the optical image under inspection. Similarly, the look-alike adjacent pattern extraction is carried out in a way which follows. For elements Fi (i=1, 2, . . . , n) of the similar adjacent pattern center-point sequence (i.e., the descending-order similar adjacent point sequence) $\{Fl\}$, a rectangular area with grayscales $(r_{11}, r_{12}, \ldots, r_{1515})$ of 15×15 pixels of the specific pattern at the center thereof is extracted from the optical image being inspected.

At the dissimilarity calculation step S3, the dissimilarity calculator 20 of FIG. 1 is rendered operative to determine through computation the degree of unlikeness of a similar adjacent pattern relative to the specific pattern, that is, the dissimilarity R(n). This dissimilarity R(n) may be a parameter which numerically indicates the degree of unlikeness and is obtainable in a way which follows. Note that the dissimilarity R(n) shows non-similarity relative to the n-th one of the similar adjacent patterns, where $n \leq N$. First, calculate an accumulative square disparity between those pixels belonging to both the rectangular area with grayscales $(r_{11}, r_{12}, \ldots, r_{1515})$ of 15×15 pixels of the specific pattern and the rectangular area with grayscales $(s_{11}, s_{12}, \ldots, s_{1515})$ of 15×15 pixels of the similar peripheral pattern. Let a calculation result be Gi, which is representable by:

$$Gi = (r_{11} - s_{11})^2 + (r_{12} - s_{12})^2 + \ldots + (r_{1515} - s_{1515})^2.$$

Here, the dissimilarity R(n) is given as:

$$R(n) = (G1 + G2 + \ldots + Gn)/n.$$

Note that if n=0, R=0. Apparently, the larger the value of dissimilarity R(n), the greater the pattern dissimilarity.

At the dissimilarity calculation step S3, suppose that the dissimilarity R(n) is obtained for each similar adjacent pattern as shown in a table below.

TABLE

| Far Order n | 1 | 2 | 3 | 4 | 5 |
|---|---|---|---|---|---|
| Dissimilarity R(n) | 200 | 180 | 140 | 100 | 80 |
| Tolerance t(n) | 40 | 30 | 20 | 10 | 5 |
| Local CD Error Decision value R(n) − t(n) | 160 | 150 | 120 | 90 | 75 |

In the prior art, all of the similar adjacent patterns obtained are used together to finally determine the value of dissimilarity R(n). For example, the final dissimilarity R(5)=80 when n=5. However, in the case of this example shown in the table above, the dissimilarity R(n) becomes smaller in value with an increase of the value n. In other words, the shorter the distance between a target pixel and its adjacent pixel for inspection use, the smaller the dissimilarity value. From this viewpoint, the presence of a local CD error(s) is suspicious as in the case where the area A of FIG. 2 locally experiences identical deformation. Given this factor, the variation evaluation step S4 is specifically arranged to permit the variation evaluator 22 of FIG. 1 to obtain from the dissimilarity R(n) a local CD error criterion value for use in determination of the presence of a local CD error(s).

Usually, an increase in distance between patterns results in an increase in variation. In view of this, a variation of R(n) value in an "ideal" case where no local CD errors are present is obtained experimentally. Let the R(n) variation obtained be an allowable error or tolerance t(n). Then, the variation evaluation step S4 subtracts the tolerance t(n) from the dissimilarity R(n) to thereby calculate the local CD error decision value.

At the local CD error decision step S5, the local CD error determiner 24 of FIG. 1 is rendered operative to perform error decision. More specifically, for n ($\leq N$), perform comparison with a predefined threshold value. If the local CD error decision value R(n)−t(n) is less than the threshold then determine that a local CD error(s) must be present. In the example of Table above, when the threshold is 100, R(1)−t(1)=160, which is greater than 100. R(2)−t(2)=150, >100. R(4)−t(4)=90<100. R(5)−t(5)=75<100. Thus, for n=1 or 2, it is greater than the threshold; for n=4, 5, less than the threshold. In this way, with the local CD error detection technique of this invention, it is possible to readily determine the presence or absence of a local CD error by use of on-the-fly processes and/or values for obtaining the final dissimilarity (R(5)=80 in case n is 5) in the prior art.

While the invention has been described with reference to specific embodiments, the description is illustrative of the invention and is not to be construed as limiting the invention. Various modifications and alterations may occur to those skilled in the art without departing from the true spirit and scope of the invention as defined by the appended claims.

What is claimed is:

1. An apparatus for inspecting a pattern as formed on a workpiece being tested, said apparatus comprising:
    a search unit operative to find a plurality of similar neighboring patterns residing around a specific pattern on the workpiece and each having similarity to the specific pattern;
    a calculation unit operative to obtain a degree of dissimilarity between the specific pattern and each said similar neighboring pattern;
    a variation evaluation unit operative to exclude an allowable error from the dissimilarity to thereby obtain a local critical dimension ("CD") error criterion value; and
    a CD error decision unit operative to determine that a local CD error is present when the local CD error criterion value exceeds a threshold value in case a distance between the specific pattern and the similar neighboring pattern increases.

2. The apparatus according to claim 1, wherein said calculation unit obtains the allowable error from the dissimilarity of the specific pattern and a similar pattern in case the local CD error is absent.

3. The apparatus according to claim 1, wherein said search unit obtains the plurality of similar neighboring patterns with similarity to the specific pattern by use of a reference image as obtained from design data.

4. A method of inspecting a pattern as formed on a workpiece under testing, said method comprising:
    obtaining a plurality of similar neighboring patterns residing around a specific pattern on the workpiece and each having similarity to the specific pattern by using a neighboring pattern searching unit of an inspection apparatus;
    obtaining a degree of dissimilarity between the specific pattern and each said similar neighboring pattern by using a variation evaluation unit of the inspection apparatus;
    removing an allowable error from the dissimilarity to thereby obtain a local CD error criterion value by using a dissimilarity calculation unit of the inspection apparatus; and
    determining that a local CD error is present when the local CD error criterion value goes beyond a threshold value while a distance between the specific pattern and the similar neighboring pattern increases by using a local CD error decision unit of the inspection apparatus.

5. The method according to claim 4, further comprising:
    obtaining the allowable error from the dissimilarity of the specific pattern and a similar pattern in a case where the local CD error is absent by using the inspection apparatus.

* * * * *